United States Patent
Shen et al.

(10) Patent No.: US 11,601,859 B2
(45) Date of Patent: Mar. 7, 2023

(54) METHODS AND APPARATUSES FOR PERFORMING NEW RADIO CELL SELECTION/RE-SELECTION

(71) Applicant: Telefonaktiebolaget LM Ericsson (publ), Stockholm (SE)

(72) Inventors: Wei Shen, Linköping (SE); Icaro L. J. Da Silva, Solna (SE); Helka-Liina Määttanen, Helsinki (FI); Reza Moosavi, Linköping (SE); Pradeepa Ramachandra, Linköping (SE); Johan Rune, Lidingö (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 63 days.

(21) Appl. No.: 16/634,367

(22) PCT Filed: Aug. 9, 2018

(86) PCT No.: PCT/SE2018/050807
§ 371 (c)(1),
(2) Date: Jan. 27, 2020

(87) PCT Pub. No.: WO2019/032030
PCT Pub. Date: Feb. 14, 2019

(65) Prior Publication Data
US 2021/0099940 A1   Apr. 1, 2021

Related U.S. Application Data

(60) Provisional application No. 62/544,445, filed on Aug. 11, 2017.

(51) Int. Cl.
*H04W 36/30* (2009.01)
*H04W 36/00* (2009.01)
(Continued)

(52) U.S. Cl.
CPC ........... *H04W 36/30* (2013.01); *H04W 16/28* (2013.01); *H04W 24/10* (2013.01);
(Continued)

(58) Field of Classification Search
CPC ................. H04W 24/10; H04W 24/08; H04W 36/00837; H04W 36/0085; H04W 6/30;
(Continued)

(56) References Cited

U.S. PATENT DOCUMENTS

2009/0086648 A1* 4/2009 Xu ................... H04B 7/0689
370/252
2013/0058246 A1* 3/2013 Li ....................... H04B 7/063
370/252
(Continued)

FOREIGN PATENT DOCUMENTS

WO    2005076839 A2    8/2005

OTHER PUBLICATIONS

International Search Report and Written Opinion of the International Searching Authority for PCT International Application No. PCT/SE2018/050807 dated Nov. 30, 2018, 14 pages.
(Continued)

*Primary Examiner* — Dai Phuong
(74) *Attorney, Agent, or Firm* — Sage Patent Group

(57) ABSTRACT

A user equipment (UE) operates to select and/or re-select among radio cells provided by access nodes of a wireless communication system. The UE measures quality of beams detected from each of the cells. For each of the cells, the UE derives cell quality based on the quality of the beams from the cell. For each of the cells, the UE determines the number of good beams among the beams from the cell based on a cell quality threshold received via system information. The UE ranks the cells in a ranking list relative to each other based on the number of good beams associated with respec-
(Continued)

tive ones of the cells and the cell quality. The UE controls, based on the ranking of the cells in the ranking list the number of good beams and the cell quality, selection and/or re-selection of a cell among the cells that is to be used for UE radio communications.

25 Claims, 3 Drawing Sheets

(51) Int. Cl.
  *H04W 16/28* (2009.01)
  *H04W 24/10* (2009.01)
  *H04W 36/36* (2009.01)
  *H04W 48/16* (2009.01)

(52) U.S. Cl.
  CPC ........... *H04W 36/00835* (2018.08); *H04W 36/00837* (2018.08); *H04W 36/36* (2013.01); *H04W 48/16* (2013.01)

(58) Field of Classification Search
  CPC ... H04W 36/0061; H04W 6/08; H04W 48/20; H04W 36/30; H04W 36/00835; H04W 16/28; H04W 36/36; H04W 48/16; H04L 43/16
  See application file for complete search history.

(56) References Cited

U.S. PATENT DOCUMENTS

| | | | |
|---|---|---|---|
| 2013/0121185 A1 | 5/2013 | Li et al. | |
| 2014/0198681 A1* | 7/2014 | Jung | H04B 7/0695 370/252 |
| 2016/0262077 A1* | 9/2016 | Zhang | H04W 36/0085 |
| 2017/0111886 A1* | 4/2017 | Kim | H04W 48/14 |
| 2017/0149480 A1 | 5/2017 | Kakishima et al. | |
| 2017/0214444 A1 | 7/2017 | Nigam et al. | |
| 2018/0049081 A1* | 2/2018 | Tseng | H04W 24/10 |
| 2018/0332521 A1* | 11/2018 | Subramanian | H04W 24/10 |
| 2020/0067580 A1* | 2/2020 | Yang | H04B 7/088 |
| 2020/0187067 A1* | 6/2020 | Decarreau | H04W 24/10 |

OTHER PUBLICATIONS

Vivo, "Discussion on idle mode mobility," 3GPP TSG-RAN WG2 NR Ad Hoc, R2-1706976 (revised R2-1704583), Qingdao, China, Jun. 27-29, 2017, 3 pages.
CMCC, "Considerations on threshold for deriving cell quality," 3GPP TSG-RAN WG2 Meeting #98, R2-1705785; Hangzhou, China, May 15-19, 2017, 5 pages.

* cited by examiner

Rank one cell relative to another cell in the ranking list based on comparison of the number of good beams detected by the UE in the one cell to the number of good beams detected by the UE in the other cell, and further based on comparison of the cell quality of the one cell to the cell quality of the other — 300

*Fig. 3*

Perform the ranking of one cell relative to another cell in the ranking list based on comparison of the number of good beams detected by the UE in the one cell to the number of good beams detected by the UE in the other cell minus a good beam offset threshold and further based on comparison of the cell quality of the beams in the one cell to the cell quality of the beams in the other cell minus a quality offset threshold — 400

*Fig. 4*

Determine that neighbor cell satisfies a cell re-selection condition when at least one of the following cell re-selection conditions is determined to be satisfied — 500

A first cell re-selection condition is satisfied when the cell quality of the neighboring cell is at least a quality threshold level better than the cell quality of the serving cell — 502

A second cell re-selection condition is satisfied when the number of good beams detected in the neighboring cell is at least a threshold number more than the number of good beams detected in the serving cell — 504

*Fig. 5*

METHODS AND APPARATUSES FOR PERFORMING NEW RADIO CELL SELECTION/RE-SELECTION

CROSS REFERENCE TO RELATED APPLICATIONS

This application is a 35 U.S.C. § 371 national stage application of PCT International Application No. PCT/SE2018/050807 filed on Aug. 9, 2018, which claims the benefit of U.S. Provisional Patent Application Serial No. 62/544,445, filed on Aug. 11, 2017, the disclosures and content of which are incorporated by reference herein in their entireties.

TECHNICAL FIELD

The present disclosure relates to methods and associated operations by apparatuses for performing cell selection and re-selection in new radio wireless communication systems.

BACKGROUND

Due to the scarcity of available spectrum for future wireless communication systems, spectrum located in very high frequency ranges (compared to the frequencies that have so far been used for wireless communication), such as 10 GHz and above, are planned to be utilized for future mobile communication systems. These further systems include the 5G system being standardized by 3GPP, for which the Radio Access Network part is referred to as New Radio (NR) and the core network part is referred to as Next Generation Core (NGC).

For such high frequency spectrum, the atmospheric, penetration and diffraction attenuation properties can be much worse than for lower frequency spectrum. In addition, the receiver antenna aperture, as a metric describing the effective receiver antenna area that collects the electromagnetic energy from an incoming electromagnetic wave, is inversely proportional to the frequency. Consequently, if omnidirectional receive and transmit antennas are used, the link budget will be worse for the same link distance even in a free space scenario. This motivates the usage of beamforming to compensate for the loss of link budget, and the resulting poor SNR/SINR, in the high frequency spectrum. Beamforming may be used at the transmitter, at the receiver, or at both. In a large part of the spectrum planned for 5G deployments, a possibly preferred configuration is to use a larger number of antennas arranged in an array at the Access Node (AN) (e.g., gNB, Transmission and/or Reception Point (TRP), eNB) and to use a smaller number of antennas arranged in an array at the UE. The larger antenna array at the AN enables high-order transmit beamforming in the downlink communications.

For the above reasons, future systems are expected to make heavy use of high-gain, narrow beamforming, which will enable high data rate transmission coverage to very distant users who would not otherwise have sufficient coverage with normal sector-wide or omnidirectional beams having lower antenna gain.

High or medium gain beamforming has traditionally mostly been used to increase the achievable data rates for individual user equipments (UEs). However, for 5G/NR, beamforming is expected to be used also for common control signaling, i.e. control signal transmissions that are not targeting a specific UE, but is intended to be received by all or a group of UEs in the coverage area. Such common control signaling includes, for example, synchronization signals, broadcast system information, and common reference signals.

Cell Re-Selection

For cell selection and re-selection in NR, there are several high-level operations that have been agreed upon by members to various 3GPP meetings. These operations are:
  The UE will camp on the best NR cell;
  The UE will perform cell selection and cell re-selection on NR cells; and
  The UE will perform cell selection and cell re-selection on NR cells, having LTE mechanism as baseline.

In LTE, a UE in RRC_IDLE state shall measure the Reference Signal Received Power (RSRP) and Reference Signal Received Quality (RSRQ) level of cells and evaluate the cell selection criterion and cell re-selection criterion based on the measurements. The UE will select a suitable cell which needs to fulfil several requirements including fulfilling the cell selection criterion, S, to camp on to obtain normal service. After camping on a cell, the UE shall still measure and evaluate the serving cell and non-serving cells. When the UE switches from camping on one cell to camping on another cell, this is known as cell re-selection.

In LTE, the cell re-selection procedure allows a camped UE to reselect a more suitable cell and camp on it. In that process, cell re-selection between frequencies and RATs is mainly based on absolute priorities. The UE initially evaluates the frequencies of all RATs based on their priorities and then compares the cells on the relevant frequencies based on radio conditions, using a ranking criterion before reselecting to the target cell (also depending on its accessibility). The UE ranks the intra-frequency cells and the cells on other frequencies having equal priority which fulfil the S-criterion, as discussed in the previous section, using the co-called R-criterion, defined as follows:

For the serving cell, $R_s = Q_{meas\_s} + Q_{Hyst} - Qoffset_{temp}$
For neighbour cells $R_n = Q_{meas\_n} - Qoffset - Qoffset_{temp}$ where the term Qmeas is the RSRP measurement quantity used in cell re-selections, Qhyst controls the degree of hysteresis for the ranking, and Qoffset is an offset applicable between serving and neighbouring cells on frequencies of equal priority (the sum of the cell-specific and frequency-specific offsets). The term Qoffsettemp is an offset temporarily applied to a cell.

Synchronization Signals Block (SSB)

A UE performs cell selection and re-selection based on the measurements on downlink signals.

In New Radio (NR), a Synchronization Signal (SS) block consists of time-division multiplexed components each with the duration of one symbol as follows: (a) Primary Synchronization Signal (PSS), (b) Physical Broadcast Channel denoted PBCH, (c) Secondary Synchronization Signal (SSS) and finally (d) PBCH. PBCH carries a small part of the system information, sometimes referred to as the Master Information Block (MIB). The PSS+PBCH+SSS+PBCH structure is denoted SS Block (SSB).

Depending on the deployment, beamforming may be used to distribute the SSB over the coverage area of a cell. Each SSB instance is beamformed in a certain direction, either to ensure coverage or to provide beam finding support for subsequent link establishment. For improving coverage (or beam finding), the SS Block may be transmitted using beam sweeping where SSB is transmitted sequentially through pre-determined beam patterns that together cover the desired area. Another approach for improving coverage is repetition of wide (even omnidirectional) beam transmissions. Both beam sweeping and repetition involves multiple transmissions.

It has been agreed in the 3GPP meetings that Secondary Synchronization Signal (SSS) and Demodulation Reference Signal (DMRS) of PBCH are used for Downlink (DL) based RRM measurement for UE in RRC_IDLE or RRC_INACTIVE state. In other words, a UE in RRC_IDLE or RRC_INACTIVE state performs cell selection and re-selection based on measurements on the SS Blocks associated to cells.

Cell-Level Measurement in NR

As discussed above, the cell-level measurement is required for cell ranking R-criterion in the cell re-selection evaluation procedure. There are several agreements in 3GPP meetings about the cell quality derivation as follows.

According to the 3GPP agreement from the RAN2 #NR Ad Hoc meeting in Qingdao, the cell quality derived for an RRC_CONNECTED UE is as follows:

Cell quality should be derived by averaging the best beam with the up to N−1 best beams above absolute configured threshold.

In the particular topic of cell quality derivation in RRC_IDLE/RRC_INACTIVE, the following has been agreed in the RAN2 #Ad Hoc meeting in Spokane:

In multi-beam operations, measurement quantity of a cell is derived amongst the beams corresponding to the same cell; and FFS how to derive the cell level measurement quantity from multiple beams (may or may not be different from connected).

In RAN2 #97, in Athens, the following has been agreed:

For cell re-selection, cell quality can be derived from N best beams where the value of N can be configured to 1 or more than 1;

FFS: Details of filtering to be applied (e.g. for the case N=1, the best beam is filtered by a single filter as the best beam changes); and FFS: Whether to only consider beams above a threshold ('good' beams).

It is noted that the agreements related to cell quality derivation appear to go in the same directions as the agreements related to RRC_CONNECTED, although it is clearly stated that if needed they might differ.

SUMMARY

Some embodiments of the present disclosure are directed to a method of operating a user equipment (UE) for selecting and/or re-selecting among radio cells that are provided by access nodes of a wireless communication system. The method includes measuring quality of beams detected from each of the cells. For each of the cells, the method derives cell quality based on the quality of the beams from the cell. Moreover, for each of the cells, the method determines the number of good beams among the beams from the cell based on a cell quality threshold received via system information. The method ranks the cells in a ranking list relative to each other based on the number of good beams associated with respective ones of the cells and the cell quality. The method controls, based on the ranking of the cells in the ranking list and based on conditions of the number of good beams and the cell quality, selection and/or re-selection of a cell among the cells that is to be used for radio communications by the UE.

A potential advantage that can be provided by aspects of these and further embodiments is that the number of good beams is determined and used as part of the cell selection and/or re-selection criteria and for the conditions to trigger the cell selection and/or re-selection for a UE, which may be a camping UE in RRC_IDLE or RRC_INACTIVE. Through this method, a camped UE in IDLE or INACTIVE mode may have a lower probability of frequently performing cell re-selection and handover, e.g., by having initially selected the best cell with the best cell quality and number of good beams relative to other neighbor cells.

Some related embodiments are directed to a corresponding UE for selecting and/or re-selecting among radio cells provided by access nodes of a wireless communication system. The UE is configured to measure quality of beams detected from each of the cells. For each of the cells, the UE drives cell quality based on the quality of the beams from the cell. For each of the cells, the UE determines the number of good beams among the beams from the cell. The UE ranks the cells in a ranking list relative to each other based on the number of good beams associated with respective ones of the cells and the cell quality. The UE controls, based on the ranking of the cells in the ranking list and based on conditions of the number of good beams and the cell quality, selection and/or re-selection of a cell among the cells that is to be used for radio communications by the UE.

Some related embodiments are directed to a corresponding UE that includes a radio transceiver, at least one processor, and at least one memory coupled to the at least one processor and storing program code that when executed by the at least one processor causes the at least one processor to perform operations. The operations include: measuring quality of beams detected from each of the cells; for each of the cells, deriving cell quality based on the quality of the beams from the cell; for each of the cells, determining the number of good beams among the beams from the cell based on a cell quality threshold received via system information; ranking the cells in a ranking list relative to each other based on the number of good beams associated with respective ones of the cells and the cell quality; and controlling, based on the ranking of the cells in the ranking list and based on conditions of the number of good beams and the cell quality, selection and/or re-selection of a cell among the cells that is to be used for radio communications by the UE.

Some other methods and related operations by a network node (110), include obtaining a comparisonQualityThreshold value, and broadcasting the comparisonQualityThreshold value through system information for receipt by user equipments.

It is noted that aspects described with respect to one embodiment disclosed herein may be incorporated in different embodiments although not specifically described relative thereto. That is, all embodiments and/or features of any embodiments can be combined in any way and/or combination. Moreover, methods and apparatuses according to embodiments will be or become apparent to one with skill in the art upon review of the following drawings and detailed description. It is intended that all such additional methods and apparatuses be included within this description and protected by the accompanying claims.

BRIEF DESCRIPTION OF THE DRAWINGS

The accompanying drawings, which are included to provide a further understanding of the invention and are incorporated in and constitute a part of this application, illustrate certain embodiments of the invention. In the drawings:

FIGS. 3 and 4 are flowcharts of operations that can be performed by a UE to rank cells, according to some embodiments;

FIG. 5 illustrates operations and methods that can be performed by a UE to control cell selection and/or re-selection, according to some embodiments;

DETAILED DESCRIPTION

Figure 1:
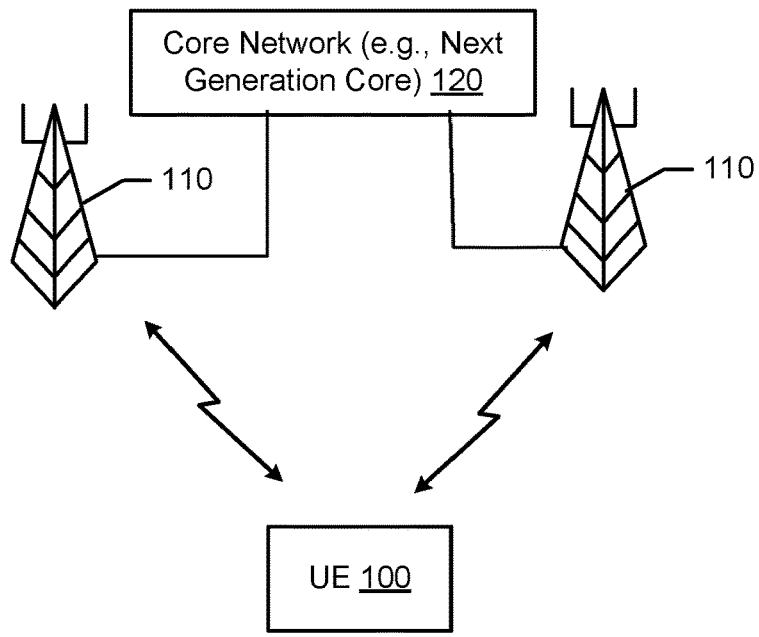
FIG. 1 shows a block diagram of a wireless communication system that includes a pair of radio access nodes that communicate through a radio air interface with a UE configured according to embodiments disclosed herein.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment. Any two or more embodiments described below may be combined in any way with each other.

Problems with Previously Proposed Solutions

The previously proposed solutions in the standardization work to derive the cell quality are applicable to derive the cell-level measurement quantity used in cell ranking, R-criterion, for the intra-frequency cell re-selection. The problem is that the cells in the ranking list may have different numbers of "good beams", which may result in the following issues:

A camped UE may have to perform cell re-selection more frequently;

A camped UE may have to perform handover in the CONNECTED mode more frequently;

A camped UE may have to stay longer on the serving cell even when there is a more suitable cell to camp on, which, in turn, introduces a delay for cell re-selection; and/or The comparison of the suitability of two cells may be unfair, due to averaging over different numbers of "good beams", where a greater number of "good beams" may decrease the quality average and thereby lower the cell's ranking instead of increasing it.

Take the following example to illustrate the problem. Assume that there are two neighbor cells for a UE, Cell A and Cell B, in the cell ranking list. During the RRM measurement, UE detects a single good beam from the Cell A and two good beams from the Cell B. For the two beams in Cell B, one beam has the similar quality as the beam of Cell A, and the quality of the other is slightly lower than the former. Cell A is better ranked than Cell B based on known approaches. If the cell re-selection condition is fulfilled, i.e., there is a neighbor cell which is better ranked than the serving cell during a certain time interval denoted as Cell Re-selection Time Interval, the UE shall reselect the better ranked cell as the new serving cell. Assume that both of Cell A and Cell B fulfil the condition and Cell A is ranked as the best cell, the UE will select Cell A as the new serving cell. If the beam quality in Cell A is deteriorated after the re-selection, the UE has to reselect another better ranked cell in the IDLE mode, or it has to handover to another better ranked cell if UE enters the CONNECTED mode. If the quality deterioration occurs during the Cell Re-selection Time Interval, the UE has to stay on the current cell and retry another better ranked cell to camp on.

Overview of Embodiments of the Present Disclosure

FIG. 1 shows a block diagram of a wireless communication system that includes a pair of radio access nodes 110 (e.g., NR access nodes, gNR, transmission and/or reception point (RTP), eNB) that communicate through a radio air interface with a UE 100. The access nodes 110 are connected to a core network 120, such as a Next Generation Core network.

Figure 2:
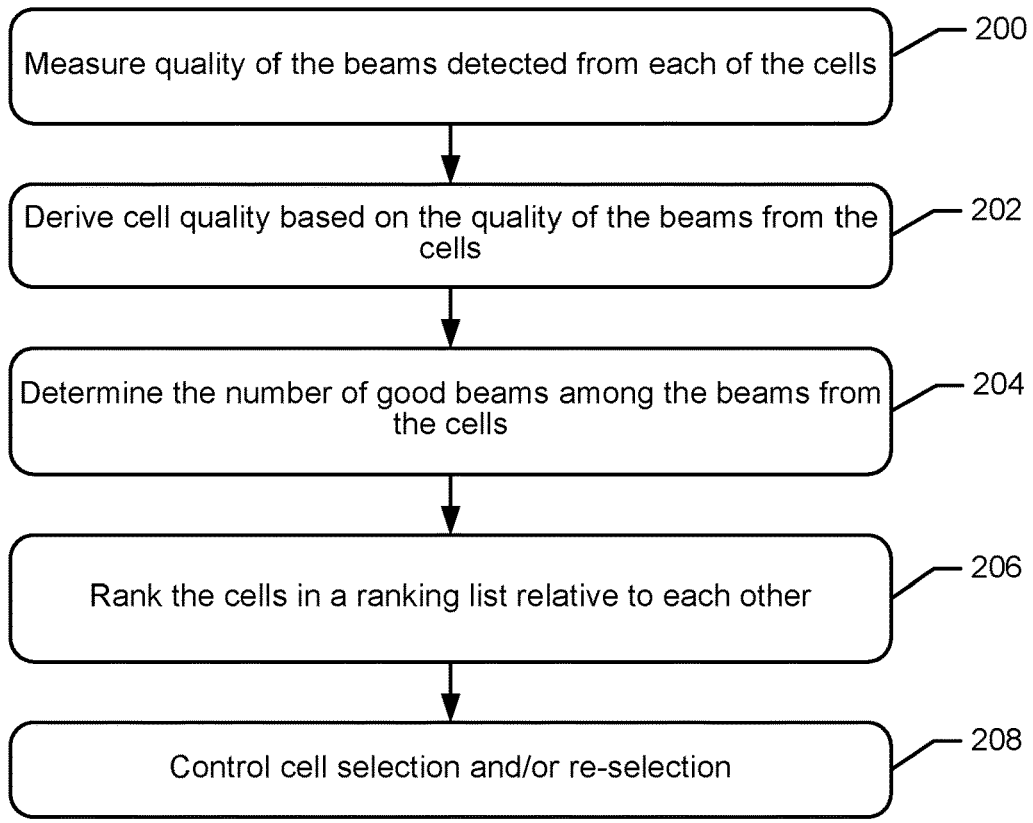
FIG. 2 is a flowchart of operations and methods that can be performed by a UE for selecting and/or re-selecting among radio cells, according to some embodiments.

Various embodiments of the present disclosure are directed to improving cell selection and/or re-selection by the UE 100 based on a fair cell ranking between the radio communication cells, provided by the radio access nodes 110 and 110, that takes into account how many good beams are determined to exist within the cells. FIG. 2 is a flowchart of operations and methods that can be performed by a UE, such as the UE 100 of FIG. 1, for selecting and/or re-selecting among radio cells provided by access nodes of a wireless communication system, in accordance with some embodiments.

Referring to FIG. 2, the UE measures (block 200) quality of the beams detected from each of the cells. For each of the cells, the UE derives (block 202) cell quality based on the quality of the beams from the cell. Further, for each of the cells, the UE determines (block 204) the number of good beams among the beams from the cell based on a cell quality threshold received via system information. The cells are ranked (block 206) in a ranking list relative to each other based on the number of good beams associated with respective ones of the cells and the cell quality. The UE then controls (block 208), based on the ranking of the cells in the ranking list and based on conditions of the number of good beams and the cell quality, selection and/or re-selection of a cell among the cells that is to be used for radio communications by the UE.

A fair cell ranking is therefore provided between cells based on the number of good beams detected by a UE in the respective cells. These embodiments operate according to defined rules where the number (N) of beams and their individual qualities are part of the cell re-selection criteria, in addition to the cell quality when N is configured to be greater than 1. In some embodiments, the cell quality is derived for different cells by performing averaging of detected and/or good beams, and, to steer the cell re-selection to cells with more good beams. This approach is more likely to provide a stable service coverage over time to the UE.

Potential Advantages of Embodiments of the Present Disclosure

Methods and corresponding operations by apparatuses can enable a camping UE to make a fair cell ranking for the cells with different numbers of good beams. A camped UE in IDLE/INACTIVE mode can have a lower probability of needing to frequently perform cell re-selection and handover, and a lower probability of introducing unnecessary delay during the cell re-selection procedure.

Reference is again made to the example discussed above, in which there are two neighbor cells for a UE, Cell A and Cell B, in the cell ranking list. During the radio resource management (RRM) measurement, the UE detects a single good beam from the Cell A and two good beams from the Cell B. For the two beams in Cell B, one beam has the similar quality as the beam of Cell A; the quality of the other is slightly lower than the former. As a result, Cell B is better ranked than Cell A in accordance with at least some of the present embodiments. If the cell re-selection condition is fulfilled, the UE shall reselect the better ranked cell B as the new serving cell. There is a higher probability that the cell quality of the Cell B which has a greater number of good beams than that of Cell A and will be more stable over time for use by the UE.

Terminology

Various methods and UEs according to various embodiments can operate to provide a fair cell ranking between cells having different numbers of good beams detected by the UEs. Various terms used below during the description of these embodiments are defined as follows:

Ngoodbeam_s: the number of good beams detected by UE in serving cell

Ngoodbeam_n: the number of good beams detected by UE in neighboring cell

Qmeas: cell-level measurement quantity

Qmeas_s: cell-level measurement quantity for serving cell

Qmeas_n: cell-level measurement quantity for neighboring cell

Rquality_s: the cell quality based cell ranking criterion for serving cell

Rquality_n: the cell quality based cell ranking criterion for neighboring cell

Rnumber_s: the number of good beams based cell ranking criterion for serving cell Rnumber_n: the number of good beams based cell ranking criterion for neighboring cell Tre-selection: the time interval for a UE to evaluate if a better ranked cell to fulfil the re-selection condition comparisonQualityThreshold: a threshold in dB to compare with the difference between the cell quality quantity from any two cells in the ranking list to determine a ranking order comparisonNumberBeamsThreshold: a threshold for the difference between the number of good beams from any two cells in the ranking list to determine a ranking order qualityThreshold: a threshold in dB to compare with the difference between Rquality_n and Rquality_s to determine if the re-selection conditions are fulfilled numberBeamsThreshold: a threshold to compare with the difference between Ngoodbeam_n and Ngoodbeam_s to determine if the re-selection conditions are fulfilled Vsuit: a suitability value derived from a function of cell quality and number of good beams UE Configuration (Step 100)

There are four parameters, comparisonQualityThreshold, comparisonNumberBeamsThreshold, qualityThreshold, numberBeamsThreshold, for a camping UE in RRC_IDLE state or RRC_INACTIVE state, which are preferably configurable and conveyed to the UE via system information. The cell quality threshold that the UE receives via system information from a network node can be any one or more of these four parameters, i.e., comparisonQualityThreshold, comparisonNumberBeamsThreshold, and/or qualityThreshold, numberBeamsThreshold. It may be included in SI that is periodically broadcast (e.g. the so-called "minimum SI" in NR or in SI which is provided on-demand (e.g. part of the "other SI" in NR). Providing the two parameters through dedicated signaling is also an option, e.g. for a UE in RRC_CONNECTED including when the UE is switched to RRC_IDLE or RRC_INACTIVE state. Such dedicated signaling may override any corresponding information in the SI (if any). Yet another alternative is that the two parameters are pre-defined through standardization as a pre-configuration.

Note that these parameters may be cell specific, i.e. be different for different neighbor cells. A serving cell may thus instruct a UE to apply different parameters and/or conditions when considering cell re-selection and when comparing different neighbor cells with each other (for ranking) and/or with the serving cell.

UE Measuring SS Blocks and Deriving the Number of Good Beams (Step 200)

The measurement of quality of the beams detected from each of the cells may be based on at least one of Reference Signal Received Power (RSRP) and Reference Signal Received Quality (RSRQ).

According to various member agreements in 3GPP, the network can configure a UE in IDLE mode to use a measurement timing configuration window per frequency carrier. A configured UE shall then detect and measure the Synchronization Signal (SS) Blocks of the serving cell and neighbor cells in that configuration window. The beam quality, the cell quality and the number of good beams can be derived from the measurements.

In accordance with some embodiments of the present disclosure, operations to determine whether a detected beam is a good beam, include at least one of:

The difference of the beam quality between the detected beam and the best beam in the same cell as the detected beam is smaller than a relative threshold;

The difference of the beam quality between the detected beam and the best beam of the serving cell is smaller than a relative threshold; and The difference between the beam quality of the detected beam and a cell quality value of the serving cell or the same cell as the detected beam is smaller than a relative threshold.

The beam quality of the detected beam is larger than an absolute threshold.

Accordingly, the UE can perform various alternative operations to determine the number of good beams, as explained further below.

In one embodiment, for each of the cells, the number of good beams detected from the cell is determined (block 204) by the UE based on how many of the beams have quality above the cell quality threshold.

In another embodiment, for each of the cells, a detected beam is counted by the UE as a good beam among the beams of the cell responsive to determining (block 204) that a difference in quality between the detected beam and another beam having the highest quality in the same cell as the detected beam is smaller than a relative threshold defined based on the cell quality threshold.

In another embodiment, for each of the cells, a detected beam is counted by the UE as a good beam among the beams of the cell responsive to determining (block 204) that a difference in quality between the detected beam and another beam having the highest quality in a serving cell of the UE is smaller than a relative threshold defined based on the cell quality threshold.

In another embodiment, for each of the cells, a detected beam is counted by the UE as a good beam among the beams of the cell responsive to determining (block 204) that a difference between quality of the detected beam and cell quality of a serving cell of the same cell as the detected beam is smaller than a relative threshold defined based on the cell quality threshold.

UE Performing Ranking of Cells (Step 300)

In accordance with some embodiments, the number of good beams based criterion, denoted as Rnumber_s for the serving cell and Rnumber_n for the neighboring cell, which will be used for ranking of cells together with the cell quality based criterion, Rquality_s for the serving cell and Rquality_n for the neighboring cell. These criteria can be similarly used for LTE.

In one embodiment, Rnumber_s is equal to the number of good beams detected by UE in serving cell, referred to as Ngoodbeam_s. Rnumber_n is equal to the number of good beams detected by UE in neighboring cell, referred to as Ngoodbeam_n.

The UE performs rankings of all cells that fulfil the cell selection criterion based on the ranking criterion, Rnumber_s, Rnumber_n and Rquality_s Rquality_n.

In accordance with some embodiments, conditions under which a cell is better ranked than another cell are determined based on at least one of the following conditions:

RANKING_COND1: the cell quality Qmeas of a cell is at least comparisonQualityThreshold (in dB) better than that of another cell in the ranking list.

RANKING_COND2: the number of good beams of a cell is at least comparisonNumberBeamsThreshold more than that of another cell in the ranking list.

In one embodiment, both of the RANKING_COND1 and RANKING_COND2 need to be fulfilled, when a cell is considered as better ranked than another in the ranking list.

In another embodiment, either RANKING_COND1 or RANKING_COND2 need to be fulfilled, when a cell is considered as better ranked than another in the ranking list.

FIG. 3 is a flowchart of operations that can be performed by a UE to rank cells. Referring to the embodiments of FIGS. 2 and 3, the UE performs the ranking (block 206 of FIG. 2, block 300 of FIG. 3) of one cell relative to another cell in the ranking list based on comparison of the number of good beams detected by the UE in the one cell to the number of good beams detected by the UE in the other cell, and further based on comparison of the cell quality of the one cell to the cell quality of the other cell.

The ranking (block 206 of FIG. 2, block 300 of FIG. 3) of the one cell relative to the other cell in the ranking list, can include ranking (block 300) the one cell higher than the other cell in the ranking list based on determining at least one of the following conditions is satisfied:

a first ranking condition is satisfied when the cell quality of the one cell is at least a quality threshold level, defined based on the cell quality threshold, better than the cell quality of the other cell; and a second ranking condition is satisfied when the number of good beams of the one cell is at least a good beams threshold number more than the number of good beams of the other cell.

In a further embodiment, the UE ranks the one cell higher than the other cell in the ranking list only when both of the first and second ranking conditions are satisfied. Thus, the UE can rank the one cell higher than the other cell in the ranking list when either of the first and second ranking conditions are satisfied, or, according to another embodiment, when only both of the first and second ranking conditions are satisfied.

In another embodiment, the ranking is based on a tradeoff between the number of good beams criterion and the cell quality criterion. For instance, cell A may be higher ranked than cell B, Qmeas,A>Qmeas,B AND Ngoodbeam,A>Ngoodbeam,B−BeamDiff, where BeamDiff e.g. may be set to 2. In another example, cell A may be higher ranked than cell B, if Ngoodbeam,A>Ngoodbeam,B AND Qmeas,A>Qmeas,B−QualDiff, where QualDiff e.g. may be set to 2 dB (or a value measured in W in the linear domain). More generally, the ranking between two cells may be based on a formula taking both cell quality and number of good beams into account. Each cell may for instance get a suitability value, Vsuit derived from a function of cell quality and number of good beams, e.g. Vsuit=f(Qmeas, Ngoodbeam). An example of such a function could be Vsuit=f(Qmeas, Ngoodbeam)=k1×Qmeas+k2×Ngoodbeam, where k1 and k2 could be configurable and may be different for different neighbor cells. If Vsuit of cell A is greater than Vsuit of cell B (i.e. Vsuit,A>Vsuit,B), then cell A is higher ranked than cell B.

Accordingly, the ranking (206 of FIG. 2) can alternatively be based on comparison to defined offset thresholds. FIG. 4 is a flowchart of operations and methods that can be performed by a UE to rank cells according to some embodiments. Referring to FIG. 4, the UE performs the ranking (block 400) of one cell relative to another cell in the ranking list based on comparison of the number of good beams detected by the UE in the one cell to the number of good beams detected by the UE in the other cell minus a good beam offset threshold, BeamDiff, and further based on comparison of the cell quality of the beams in the one cell to the cell quality of the beams in the other cell minus a quality offset threshold, QualDiff.

UE Re-Selecting a Better Ranked Cell when the Conditions are Fulfilled (Step 400)

As long as a camped UE finds at least one better ranked neighboring cell, the UE shall evaluate whether the serving-cell candidate fulfils the re-selection conditions within a defined configurable time window, e.g., Tselection. In accordance with some embodiments, cell re-selection conditions for a camped UE to reselect a new better ranked cell include at least one of the following conditions:

RESELECT_COND1: the cell ranking quality criterion for neighboring cell, Rn, is at least qualityThreshold (in dB) better than that of the serving cell, Rs, i.e., Rn−Rs>qualityThreshold; and RESELECT_COND2: number of good beams detected in neighboring cell, Ngoodbeam_n, is at least numberBeamsThreshold more than that in serving cell, Ngoodbeam_s, i.e., Ngoodbeam_n−Ngoodbeam_s>numberBeamsThreshold.

In one embodiment, at least the conditions RESELECT_COND1 and RESELECT_COND2 need to be fulfilled, when a camped UE reselects a better ranked cell from the ranking list.

In another embodiment, at least either RESELECT_COND1 or RESELECT_COND2 need to be fulfilled, when a camped UE reselects a better ranked cell from the ranking list.

FIG. 5 illustrates corresponding operations and methods that can be performed by a UE to control cell selection and/or re-selection. Referring to FIG. 5, the neighboring cell is determined (block 500) by the UE to satisfy the at least one defined cell re-selection condition within the defined configurable time window when at least one of the following cell re-selection conditions is determined to be satisfied:

a first cell re-selection condition (block 502) is satisfied when the cell quality of the neighboring cell is at least a quality threshold level better than the cell quality of the serving cell; and a second cell re-selection condition (block 504) is satisfied when the number of good beams detected in the neighboring cell is at least a threshold number more than the number of good beams detected in the serving cell.

In a further embodiment, the UE determines that the neighboring cells satisfies the at least one defined cell re-selection condition only when both of the first and second ranking conditions are satisfied. Thus, the UE can rank the one cell higher than the other cell in the ranking list when either of the first and second ranking conditions are satisfied, or, according to another embodiment, when only both of the first and second cell re-selection conditions are satisfied.

In yet another embodiment, the UE performs cell re-selection to neighbor cell n, if Vsuit_n>Vsuit_s. In a variation of this embodiment, the UE performs cell re-selection if Vsuit_n>Vsuit_s+SuitDiff, where SuitDiff is a configurable threshold value that creates a hysteresis when re-selecting back and forth between two cells.

Accordingly, determination of the first and second cell re-selection conditions (502 and 504) can alternatively be based on comparison to defined thresholds. The UE may operate to determine that the first cell re-selection condition is satisfied when the cell quality of the neighboring cell is at least the quality threshold level, defined based on the cell quality threshold, better than the cell quality of the serving cell minus a quality offset threshold. Similarly, the UE may operate to determine that the second cell re-selection condition is satisfied when the number of good beams detected in the neighboring cell is at least the threshold number more than the number of good beams detected in the serving cell minus a good beam offset threshold.

In some other embodiments, initiation of re-selection is conditioned on one or more other conditions being satisfied.

These methods and corresponding operations for NR cell re-selection are also applicable to NR cell handover. In the handover case, it is the gNB that executes the method and corresponding operations, i.e. performs the ranking and handover decisions.

Results and Potential Benefits of Various Embodiments

As noted above, various embodiments take into account the number of good beams as part of the cell re-selection criteria and the conditions to trigger the cell re-selection for a camping UE in RRC_IDLE or RRC_INACTIVE. A camped UE in IDLE or INACTIVE mode may have a lower probability of frequently performing cell re-selection and handover, and/or a lower probability of introducing unnecessary delay during the cell re-selection procedure. As one way of taking the number of good beams into account, the cell ranking and cell re-selection criteria may be based on a combination of cell quality and number of good beams, e.g. where a function of cell quality (based on a beam quality average) and the number of good beams, such as being a function of Qmeas and Ngoodbeam, i.e., f(Qmeas, Ngoodbeam).

Example User Equipment

Figure 6:
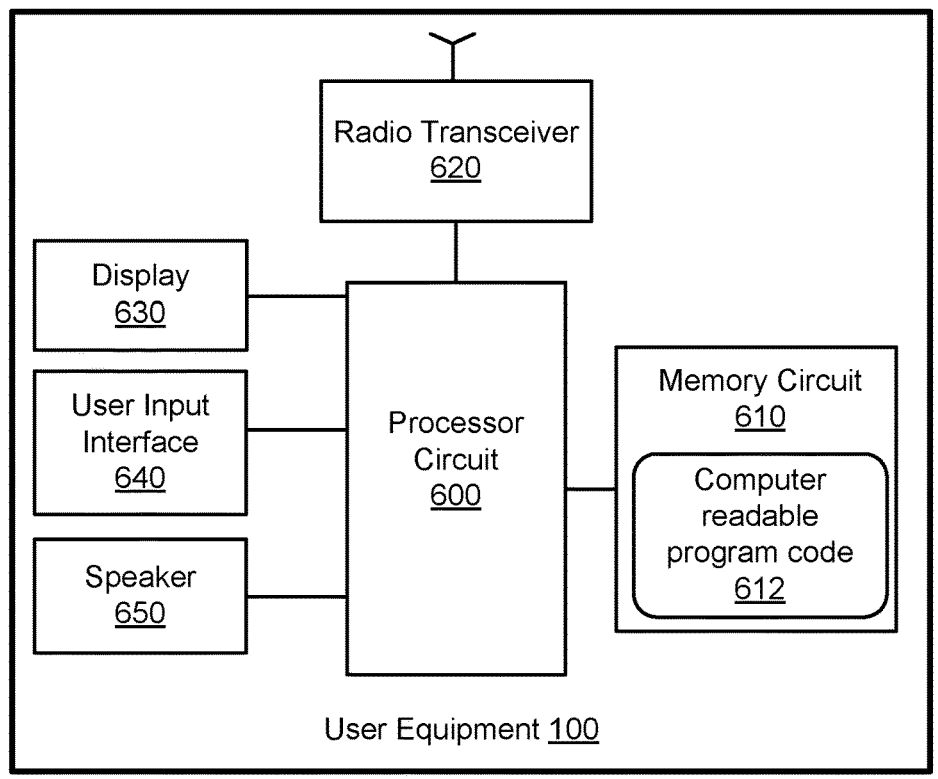
FIG. 6 is a block diagram of a UE configured according to some embodiments of the present disclosure.

FIG. 6 is a block diagram of a UE 100, for use in a wireless communications system, that is configured to perform operations according to one or more embodiments disclosed herein. The UE 100 includes a radio transceiver circuit 620 (also referred to as "radio transceiver" or transceiver for brevity), at least one processor circuit 600 (also referred to as a processor for brevity), and at least one memory circuit 610 (also referred to as a memory for brevity) containing computer readable program code 612. The UE 100 may further include a display 630, a user input interface 640, and a speaker 650.

The transceiver 620 is configured to communicate with radio access nodes, and may be configured to communicate directly with other UEs, through a radio air interface using one or more of the radio access technologies. The processor circuit 600 may include one or more data processing circuits, such as a general purpose and/or special purpose processor, e.g., microprocessor and/or digital signal processor. The processor circuit 600 is configured to execute the computer readable program code 612 in the memory circuit 610 to perform at least some of the operations described herein as being performed by a UE.

Example Modules

Figure 7:
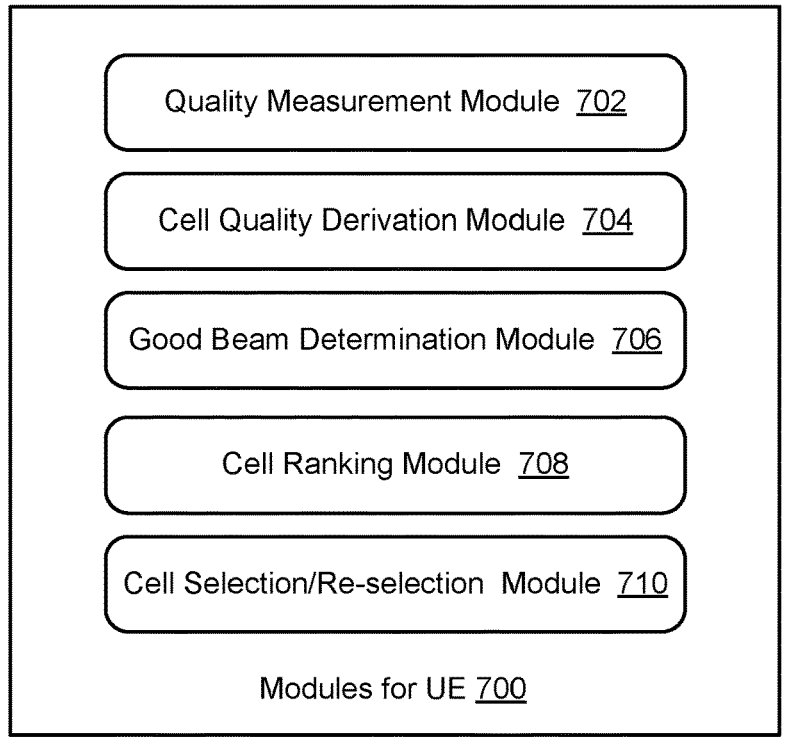
FIG. 7 illustrates modules for a UE that perform operations as disclosed herein according to some embodiments.

FIG. 7 illustrates modules 700 for a UE that perform operations as disclosed herein according to some embodiments. The modules 700 include a quality measurement module 702 for measuring quality of the beams detected from each of the cells. A cell quality derivation module 704 derives, for each of the cells, cell quality based on the quality of the beams from the cell. A good beam determination module 706 determines, for each of the cells, the number of good beams among the beams from the cell. A cell ranking module 708 ranks the cells in a ranking list relative to each other based on the number of good beams associated with respective ones of the cells and the cell quality. A cell selection and/or re-selection module 710 controls, based on the ranking of the cells in the ranking list and based on conditions of the number of good beams and the cell quality, selection and/or re-selection of a cell among the cells that is to be used for radio communications by the UE. The module 702-710 may perform these functions according to one or more of the operations disclosed herein for corresponding blocks 200-208 of FIG. 2.

Abbreviations

3GPP $3^{rd}$ Generation Partnership Project
5G $5^{th}$ Generation
AN Access Node
CSI Channel State Information
DMRS Demodulation Reference Signal
DRX Discontinuous Reception
eNB Evolved NodeB
FFS For Further Study
gNB Base station in NR (corresponding to eNB in LTE).
LTE Long Term Evolution
MIB Master Information Block
NGC Next Generation Core
NR New Radio
PBCH Physical Broadcast Channel
PSS Primary Synchronization Signal
RAN Radio Access Network
RAT Radio Access Technology
RRC Radio Resource Control
RRM Radio Resource Management
RS Reference Signal
RSRP Reference Signal Received Power RSRQ Reference Signal Received Quality
SI System Information
SINR Signal to Interference plus Noise Ratio
SNR Signal to Noise Ratio
SS Synchronization Signal
SSB Synchronization Signal Block
SSS Secondary Synchronization Signal
TRP Transmission/Reception Point
TSS Tertiary Synchronization Signal
UE User Equipment
USIM Universal Subscriber Identity Module

LISTING OF EMBODIMENTS

The following is a partial listing of embodiments of methods and UEs that operate in accordance with the present disclosure.

Embodiment 1

A method of operating a user equipment, UE, (100) for selecting and/or re-selecting among radio cells provided by access nodes (110) of a wireless communication system, the method comprising:
measuring (200) quality of the beams detected from each of the cells;
for each of the cells, deriving (202) cell quality based on the quality of the beams from the cell;
for each of the cells, determining (204) the number of good beams among the beams from the cell;
ranking (206) the cells in a ranking list relative to each other based on the number of good beams associated with respective ones of the cells and the cell quality; and
controlling (208), based on the ranking of the cells in the ranking list and based on conditions of the number of good beams and the cell quality, selection and/or re-selection of a cell among the cells that is to be used for radio communications by the UE (100).

Embodiment 2

The method of Embodiment 1, wherein:
the measurement (200) of quality of the beams detected from each of the cells is based on at least one of Reference Signal Received Power (RSRP) and Reference Signal Received Quality (RSRQ).

Embodiment 3

The method of any of Embodiments 1 to 2, wherein:
for each of the cells, the number of good beams detected from the cell is determined (204) based on averaging quality measurements of a plurality of the beams having quality above a configured threshold.

Embodiment 4

The method of any of Embodiments 1 to 3, wherein:
for each of the cells, a detected beam is counted as a good beam among the beams of the cell responsive to determining (204) that a difference in quality between the detected beam and another beam having the highest quality in the same cell as the detected beam is smaller than a relative threshold.

Embodiment 5

The method of any of Embodiments 1 to 4, wherein:
for each of the cells, a detected beam is counted as a good beam among the beams of the cell responsive to determining (204) that a difference in quality between the detected beam and another beam having the highest quality in a serving cell of the UE (100) is smaller than a relative threshold.

Embodiment 6

The method of any of Embodiments 1 to 5, wherein:
for each of the cells, a detected beam is counted as a good beam among the beams of the cell responsive to determining (204) that a difference between quality of the detected beam and cell quality of a serving cell of the same cell as the detected beam is smaller than a relative threshold.

Embodiment 7

The method of any of Embodiments 1 to 6, wherein the ranking of the cells in the ranking list relative to each other based on the number of good beams and the cell quality, comprises:
performing the ranking (206, 300) of one cell relative to another cell in the ranking list based on comparison of the number of good beams detected by the UE (100) in the one cell to the number of good beams detected by the UE (100) in the other cell, and further based on comparison of the cell quality of the one cell to the cell quality of the other cell.

Embodiment 8

The method of Embodiment 7, wherein the ranking (206, 300) of the one cell relative to the other cell in the ranking list further comprises:
ranking the one cell higher than the other cell in the ranking list based on determining at least one of the following conditions is satisfied:
a first ranking condition is satisfied when the cell quality of the one cell is at least a quality threshold level better than the cell quality of the other cell; and
a second ranking condition is satisfied when the number of good beams of the one cell is at least a good beams threshold number more than the number of good beams of the other cell.

Embodiment 9

The method of Embodiment 8, wherein the ranking (206, 300) of the one cell relative to the other cell in the ranking list further comprises:
ranking the one cell higher than the other cell in the ranking list only when both of the first and second ranking conditions are satisfied.

Embodiment 10

The method of any of Embodiments 1 to 9, wherein the ranking (206) of the cells in the ranking list relative to each other based on the number of good beams and the quality of the beams detected from respective ones of the cells, comprises:
performing the ranking (206, 400) of one cell relative to another cell in the ranking list based on comparison of the number of good beams detected by the UE (100) in the one cell to the number of good beams detected by the UE (100)

in the other cell minus a good beam offset threshold, BeamDiff, and further based on comparison of the cell quality of the beams in the one cell to the cell quality of the beams in the other cell minus a quality offset threshold, QualDiff.

Embodiment 11

The method of any of Embodiments 1 to 10, wherein the controlling (208), based on the ranking of the cells in the ranking list and based on conditions of the number of good beams and the cell quality, selection and/or re-selection of a cell among the cells that is to be used for radio communications by the UE (100), comprises:
responsive to identifying that a neighboring cell is better ranked than a serving cell of the UE (100) while the UE (100) is camped, initiating cell re-selection to the neighboring cell responsive to when the neighboring cell is determined (500) to satisfy at least one defined cell re-selection condition within a defined configurable time window.

Embodiment 12

The method of Embodiment 11, wherein the neighboring cell is determined (500) to satisfy the at least one defined cell re-selection condition within the defined configurable time window when at least one of the following cell re-selection conditions is determined to be satisfied:
a first cell re-selection condition (502) is satisfied when the cell quality of the neighboring cell is at least a quality threshold level better than the cell quality of the serving cell; and
a second cell re-selection condition (504) is satisfied when the number of good beams detected in the neighboring cell is at least a threshold number more than the number of good beams detected in the serving cell.

Embodiment 13

The method of Embodiment 12, wherein the neighboring cell is determined (500) to satisfy the at least one defined cell re-selection condition within the defined configurable time window, only when both of the first and second cell re-selection conditions are determined to be satisfied (502, 504).

Embodiment 14

The method of Embodiment 12, wherein:
the first cell re-selection condition is determined (502) to be satisfied when the cell quality of the neighboring cell is at least the quality threshold level better than the cell quality of the serving cell minus a quality offset threshold; and
the second cell re-selection condition is determined (504) to be satisfied when the number of good beams detected in the neighboring cell is at least the threshold number more than the number of good beams detected in the serving cell minus a good beam offset threshold.

Embodiment 15

A computer program product comprising a non-transitory computer readable medium storing program code that when executed by at least one processor of a UE (100) causes the UE (100) to perform operations of the method of any of Embodiments 1 to 14.

Embodiment 16

A user equipment, UE, (100) for selecting and/or re-selecting among radio cells provided by access nodes of a wireless communication system, the UE (100) being configured to:
measure quality of the beams detected from each of the cells;
for each of the cells, derive cell quality based on the quality of the beams from the cell;
for each of the cells, determine the number of good beams among the beams from the cell;
rank the cells in a ranking list relative to each other based on the number of good beams associated with respective ones of the cells and the cell quality; and
control, based on the ranking of the cells in the ranking list and based on conditions of the number of good beams and the cell quality, selection and/or re-selection of a cell among the cells that is to be used for radio communications by the UE (100).

Embodiment 17

The UE (100) of Embodiment 16 configured to perform operations of the method of any of Embodiments 2 to 14.

Embodiment 18

A user equipment, UE, (100) comprising:
a radio transceiver;
at least one processor; and
at least one memory coupled to the at least one processor and the radio transceiver, and storing program code that when executed by the at least one processor causes the at least one processor to perform operations comprising:
measuring quality of the beams detected from each of the cells;
for each of the cells, deriving cell quality based on the quality of the beams from the cell;
for each of the cells, determining the number of good beams among the beams from the cell;
ranking the cells in a ranking list relative to each other based on the number of good beams associated with respective ones of the cells and the cell quality; and
controlling, based on the ranking of the cells in the ranking list and based on conditions of the number of good beams and the cell quality, selection and/or re-selection of a cell among the cells that is to be used for radio communications by the UE (100).

Embodiment 19

The UE (100) of Embodiment 18, wherein:
the measurement of quality of the beams detected from each of the cells is based on at least one of Reference Signal Received Power (RSRP) and Reference Signal Received Quality (RSRQ).

Embodiment 20

The UE (100) of any of Embodiments 18 to 19, wherein:
for each of the cells, the number of good beams detected from the cell is based on averaging quality measurements of a plurality of the beams having quality above a configured threshold.

Embodiment 21

The UE (100) of any of Embodiments 18 to 20, wherein: for each of the cells, a detected beam is counted as a good beam among the beams of the cell responsive to determining that a difference in quality between the detected beam and another beam having the highest quality in the same cell as the detected beam is smaller than a relative threshold.

Embodiment 22

The UE (100) of any of Embodiments 18 to 21, wherein: for each of the cells, a detected beam is counted as a good beam among the beams of the cell responsive to determining that a difference in quality between the detected beam and another beam having the highest quality in a serving cell of the UE (100) is smaller than a relative threshold.

Embodiment 23

The UE (100) of any of Embodiments 18 to 22, wherein: for each of the cells, a detected beam is counted as a good beam among the beams of the cell responsive to determining that a difference between quality of the detected beam and cell quality of a serving cell of the same cell as the detected beam is smaller than a relative threshold.

Embodiment 24

The UE (100) of any of Embodiments 18 to 23, wherein the ranking of the cells in the ranking list relative to each other based on the number of good beams and the cell quality, comprises:
performing the ranking of one cell relative to another cell in the ranking list based on comparison of the number of good beams detected by the UE (100) in the one cell to the number of good beams detected by the UE (100) in the other cell, and further based on comparison of the cell quality of the one cell to the cell quality of the other cell.

Embodiment 25

The UE (100) of Embodiment 24, wherein the ranking of the one cell relative to the other cell in the ranking list further comprises:
ranking the one cell higher than the other cell in the ranking list based on determining at least one of the following conditions is satisfied:
a first ranking condition is satisfied when the cell quality of the one cell is at least a quality threshold level better than the cell quality of the other cell; and
a second ranking condition is satisfied when the number of good beams of the one cell is at least a good beams threshold number more than the number of good beams of the other cell.

Embodiment 26

The UE (100) of Embodiment 25, wherein the ranking of the one cell relative to the other cell in the ranking list further comprises:
ranking the one cell higher than the other cell in the ranking list only when both of the first and second ranking conditions are satisfied.

Embodiment 27

The UE (100) of any of Embodiments 18 to 26, wherein the ranking of the cells in the ranking list relative to each other based on the number of good beams and the quality of the beams detected from respective ones of the cells, comprises:
performing the ranking of one cell relative to another cell in the ranking list based on comparison of the number of good beams detected by the UE (100) in the one cell to the number of good beams detected by the UE (100) in the other cell minus a good beam offset threshold, BeamDiff, and further based on comparison of the cell quality of the beams in the one cell to the cell quality of the beams in the other cell minus a quality offset threshold, QualDiff.

Embodiment 28

The method of any of Embodiments 18 to 27, wherein the controlling, based on the ranking of the cells in the ranking list and based on conditions of the number of good beams and the cell quality, selection and/or re-selection of a cell among the cells that is to be used for radio communications by the UE (100), comprises:
responsive to identifying that a neighboring cell is better ranked than a serving cell of the UE (100) while the UE (100) is camped, initiating cell re-selection to the neighboring cell responsive to when the neighboring cell is determined to satisfy at least one defined cell re-selection condition within a defined configurable time window.

Embodiment 29

The method of Embodiment 28, wherein the neighboring cell is determined to satisfy the at least one defined cell re-selection condition within the defined configurable time window when at least one of the following cell re-selection conditions is determined to be satisfied:
a first cell re-selection condition is satisfied when the cell quality of the neighboring cell is at least a quality threshold level better than the cell quality of the serving cell; and
a second cell re-selection condition is satisfied when the number of good beams detected in the neighboring cell is at least a threshold number more than the number of good beams detected in the serving cell.

Embodiment 30

The method of Embodiment 29, wherein the neighboring cell is determined to satisfy the at least one defined cell re-selection condition within the defined configurable time window, only when both of the first and second cell re-selection conditions are satisfied.

Embodiment 31

The method of Embodiment 29, wherein:
the first cell re-selection condition is determined to be satisfied when the cell quality of the neighboring cell is at least the quality threshold level better than the cell quality of the serving cell minus a quality offset threshold; and
the second cell re-selection condition is determined to be satisfied when the number of good beams detected in the neighboring cell is at least the threshold number more than the number of good beams detected in the serving cell minus a good beam offset threshold.

Further Definitions and Embodiments

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A method of operating a user equipment, UE, for selecting and/or re-selecting among radio cells provided by access nodes of a wireless communication system, the method comprising:
measuring quality of beams detected from each of the cells;
for each of the cells, deriving cell quality based on the quality of the beams from the cell;
for each of the cells, counting a number of good beams among the beams from the cell based on a cell quality threshold received via system information, wherein a detected beam is counted as a good beam among the beams of the cell responsive to determining at least one of: a first difference in quality between the detected beam and another beam having the highest quality in the same cell as the detected beam is smaller than a first relative threshold defined based on the cell quality threshold; a second difference in quality between the detected beam and another beam having the highest quality in a serving cell of the UE is smaller than a second relative threshold defined based on the cell quality threshold; and a third difference in quality between the detected beam and cell quality of a serving cell of the same cell as the detected beam is smaller than a third relative threshold defined based on the cell quality threshold;
ranking the cells in a ranking list relative to each other based on the number of good beams associated with respective ones of the cells and the cell quality; and
controlling, based on the ranking of the cells in the ranking list and based on conditions of the number of good beams and the cell quality, selection and/or re-selection of a cell among the cells that is to be used for radio communications by the UE, wherein the controlling comprises: responsive to identifying that a neighboring cell is better ranked than a serving cell of the UE while the UE is camped, initiating cell re-selection to the neighboring cell responsive to when the neighboring cell is determined to satisfy at least one defined cell re-selection condition within a defined configurable time window.

2. The method of claim 1, wherein:
the measurement of quality of the beams detected from each of the cells is based on at least one of Reference Signal Received Power (RSRP) and Reference Signal Received Quality (RSRQ).

3. The method of claim 1, wherein:
for each of the cells, the number of good beams detected from the cell is determined based on how many of the beams have quality above the cell quality threshold.

4. The method of claim 1, wherein the cell quality threshold comprises comparisonQualityThreshold received via the system information.

5. The method of claim 1, wherein:
for each of the cells, the detected beam is counted as a good beam among the beams of the cell responsive to determining that the first difference in quality between the detected beam and another beam having the highest quality in the same cell as the detected beam is smaller than the first relative threshold defined based on the cell quality threshold.

6. The method of claim 1, wherein:
for each of the cells, the detected beam is counted as a good beam among the beams of the cell responsive to determining that the second difference in quality between the detected beam and another beam having the highest quality in a serving cell of the UE is smaller than the second relative threshold defined based on the cell quality threshold.

7. The method of claim 1, wherein:
for each of the cells, the detected beam is counted as a good beam among the beams of the cell responsive to determining that the third difference between quality of the detected beam and cell quality of a serving cell of the same cell as the detected beam is smaller than the third relative threshold defined based on the cell quality threshold.

8. The method of claim 1, wherein the ranking of the cells in the ranking list relative to each other based on the number of good beams and the cell quality, comprises:
performing the ranking of one cell relative to another cell in the ranking list based on comparison of the number of good beams detected by the UE in the one cell to the number of good beams detected by the UE in the other cell, and further based on comparison of the cell quality of the one cell to the cell quality of the other cell.

9. The method of claim 8, wherein the ranking of the one cell relative to the other cell in the ranking list further comprises:
ranking the one cell higher than the other cell in the ranking list based on determining at least one of the following conditions is satisfied:
a first ranking condition is satisfied when the cell quality of the one cell is at least a quality threshold level, defined based on the cell quality threshold, better than the cell quality of the other cell; and
a second ranking condition is satisfied when the number of good beams of the one cell is at least a good beams threshold number more than the number of good beams of the other cell.

10. The method of claim 9, wherein the ranking of the one cell relative to the other cell in the ranking list further comprises:
ranking the one cell higher than the other cell in the ranking list only when both of the first and second ranking conditions are satisfied.

11. The method of claim 1, wherein the ranking of the cells in the ranking list relative to each other based on the number of good beams detected from respective ones of the cells and the quality of the cells, comprises:
performing the ranking of one cell relative to another cell in the ranking list based on comparison of the number of good beams detected by the UE in the one cell to the number of good beams detected by the UE in the other cell minus a good beam offset threshold, BeamDiff, and further based on comparison of the cell quality of the one cell to the cell quality of the other cell minus a quality offset threshold, QualDiff.

12. The method of claim 1, wherein the detected beam is counted as a good beam among the beams of the cell responsive to determining the first difference in quality between the detected beam and another beam having the highest quality in the same cell as the detected beam is smaller than the first relative threshold defined based on the cell quality threshold.

13. The method of claim 1, wherein the detected beam is counted as a good beam among the beams of the cell responsive to determining the second difference in quality between the detected beam and another beam having the highest quality in a serving cell of the UE is smaller than the second relative threshold defined based on the cell quality threshold.

14. The method of claim 1, wherein the detected beam is counted as a good beam among the beams of the cell responsive to determining the third difference in quality between the detected beam and cell quality of a serving cell of the same cell as the detected beam is smaller than the third relative threshold defined based on the cell quality threshold.

15. A user equipment, UE, comprising:
a radio transceiver;
at least one processor; and
at least one memory coupled to the at least one processor and the radio transceiver, and storing program code that when executed by the at least one processor causes the at least one processor to perform operations comprising:
measuring quality of beams detected from each of the cells;
for each of the cells, deriving cell quality based on the quality of the beams from the cell;
for each of the cells, counting a number of good beams among the beams from the cell based on a cell quality threshold received via system information, wherein a detected beam is counted as a good beam among the beams of the cell responsive to determining at least one of: a first difference in quality between the detected beam and another beam having the highest quality in the same cell as the detected beam is smaller than a first relative threshold defined based on the cell quality threshold; a second difference in quality between the detected beam and another beam having the highest quality in a serving cell of the UE is smaller than a second relative threshold defined based on the cell quality threshold; and a third difference in quality between the detected beam and cell quality of a serving cell of the same cell as the detected beam is smaller than a third relative threshold defined based on the cell quality threshold;
ranking the cells in a ranking list relative to each other based on the number of good beams associated with respective ones of the cells and the cell quality; and
controlling, based on the ranking of the cells in the ranking list and based on conditions of the number of good beams and the cell quality, selection and/or re-selection of a cell among the cells that is to be used for radio communications by the UE, wherein the controlling comprises: responsive to identifying that a neighboring cell is better ranked than a serving cell of the UE while the UE is camped, initiating cell re-selection to the neighboring cell responsive to when the neighboring cell is determined to satisfy at least one defined cell re-selection condition within a defined configurable time window.

16. The UE of claim 15, wherein:
the measurement of quality of the beams detected from each of the cells is based on at least one of Reference Signal Received Power (RSRP) and Reference Signal Received Quality (RSRQ).

17. The UE of claim 15, wherein:
for each of the cells, the number of good beams detected from the cell is based on how many of the beams have quality above the cell quality threshold.

18. The UE of claim 15, wherein the cell quality threshold comprises comparisonQualityThreshold received via the system information.

19. The UE of claim 15, wherein:
for each of the cells, a detected beam is counted as a good beam among the beams of the cell responsive to determining that the first difference in quality between the detected beam and another beam having the highest quality in the same cell as the detected beam is smaller than the first relative threshold defined based on the cell quality threshold.

20. The UE of claim 15, wherein:
for each of the cells, a detected beam is counted as a good beam among the beams of the cell responsive to determining that the second difference in quality between the detected beam and another beam having the highest quality in a serving cell of the UE is smaller than the second relative threshold defined based on the cell quality threshold.

21. The UE of claim 15, wherein:
for each of the cells, a detected beam is counted as a good beam among the beams of the cell responsive to determining that the third difference between quality of the detected beam and cell quality of a serving cell of the same cell as the detected beam is smaller than the third relative threshold defined based on the cell quality threshold.

22. The UE of claim 15, wherein the ranking of the cells in the ranking list relative to each other based on the number of good beams and the cell quality, comprises:
performing the ranking of one cell relative to another cell in the ranking list based on comparison of the number of good beams detected by the UE in the one cell to the number of good beams detected by the UE in the other cell, and further based on comparison of the cell quality of the one cell to the cell quality of the other cell.

23. The UE of claim 15, wherein the detected beam is counted as a good beam among the beams of the cell responsive to determining the first difference in quality between the detected beam and another beam having the highest quality in the same cell as the detected beam is smaller than the first relative threshold defined based on the cell quality threshold.

24. The UE of claim 15, wherein the detected beam is counted as a good beam among the beams of the cell responsive to determining the second difference in quality between the detected beam and another beam having the highest quality in a serving cell of the UE is smaller than the second relative threshold defined based on the cell quality threshold.

25. The UE of claim 15, wherein the detected beam is counted as a good beam among the beams of the cell responsive to determining the third difference in quality between the detected beam and cell quality of a serving cell of the same cell as the detected beam is smaller than the third relative threshold defined based on the cell quality threshold.

* * * * *